United States Patent
Krimmer et al.

(10) Patent No.: US 11,595,127 B2
(45) Date of Patent: Feb. 28, 2023

(54) POWER-OVER-FIBER SYSTEM AND METHOD FOR OPERATING A POWER-OVER-FIBER SYSTEM

(71) Applicant: Rohde & Schwarz GmbH & Co. KG, Munich (DE)

(72) Inventors: Roland Krimmer, Germering (DE); Andreas Ziegler, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 156 days.

(21) Appl. No.: 16/917,282

(22) Filed: Jun. 30, 2020

(65) Prior Publication Data
US 2021/0409116 A1 Dec. 30, 2021

(51) Int. Cl.
| | |
|---|---|
| *H04B 10/516* | (2013.01) |
| *H04B 10/25* | (2013.01) |
| *H04B 10/67* | (2013.01) |
| *H04B 10/69* | (2013.01) |
| *H04B 10/54* | (2013.01) |
| *H04B 10/80* | (2013.01) |
| *H02J 50/30* | (2016.01) |
| *H04B 10/50* | (2013.01) |

(52) U.S. Cl.
CPC .......... *H04B 10/25* (2013.01); *H04B 10/541* (2013.01); *H04B 10/672* (2013.01); *H04B 10/69* (2013.01); *H02J 50/30* (2016.02); *H04B 10/504* (2013.01); *H04B 10/516* (2013.01); *H04B 10/806* (2013.01); *H04B 10/807* (2013.01); *H04B 10/808* (2013.01)

(58) Field of Classification Search
CPC .... H04B 10/25; H04B 10/541; H04B 10/672; H04B 10/69; H04B 10/504; H04B 10/516; H04B 10/806; H04B 10/807; H04B 10/808; H02J 50/30
USPC .................................. 398/140–172, 182–201
See application file for complete search history.

(56) References Cited

U.S. PATENT DOCUMENTS

| | | | | |
|---|---|---|---|---|
| 5,099,144 A | * | 3/1992 | Sai ........................ | H02J 50/30 250/227.21 |
| 5,162,935 A | * | 11/1992 | Nelson .................. | H04B 10/25 250/227.21 |
| 5,453,866 A | * | 9/1995 | Gross ................... | H04B 10/807 398/136 |

(Continued)

FOREIGN PATENT DOCUMENTS

GB 2177869 A 1/1987

*Primary Examiner* — Dibson J Sanchez
(74) *Attorney, Agent, or Firm* — Ditthavong, Steiner & Mlotkowski

(57) ABSTRACT

The invention relates to a power-over-fiber (PoF) system, comprising: an optical source configured to generate an optical signal, wherein the optical signal comprises an intensity modulation; an optical fiber configured to receive the optical signal from the optical source and to guide the optical signal; an optical sink, which is configured to receive the optical signal from the optical fiber and to convert the optical signal into an electrical signal; a detection unit, which is configured to detect at least one characteristic of the electrical signal, wherein the characteristic is at least partially caused by the intensity modulation of the optical signal; and a control unit, which is configured to control the optical source based on the detected characteristic.

14 Claims, 5 Drawing Sheets

(56) References Cited

U.S. PATENT DOCUMENTS

| | | | | | |
|---|---|---|---|---|---|
| 5,526,164 | A * | 6/1996 | Link | H04B 10/564 | 398/195 |
| 5,528,409 | A * | 6/1996 | Cucci | H04B 10/807 | 398/171 |
| 5,530,712 | A * | 6/1996 | Solina | H04B 10/564 | 372/38.07 |
| 5,796,890 | A * | 8/1998 | Tsuji | G08C 23/06 | 398/1 |
| 6,271,942 | B1 * | 8/2001 | Sasai | H04B 10/564 | 398/9 |
| 6,993,459 | B2 * | 1/2006 | Carrick | H04B 10/564 | 702/57 |
| 8,358,893 | B1 * | 1/2013 | Sanderson | G02B 6/4415 | 385/115 |
| 9,974,129 | B1 * | 5/2018 | Xiong | H05B 45/385 | |
| 9,979,480 | B1 * | 5/2018 | Schubert | H04B 10/807 | |
| 10,064,254 | B1 * | 8/2018 | Zhang | H02M 1/14 | |
| 2004/0266367 | A1 * | 12/2004 | Tuominen | H04B 10/807 | 455/91 |
| 2008/0128587 | A1 * | 6/2008 | Lyu | H01S 5/06832 | 250/205 |
| 2009/0016715 | A1 * | 1/2009 | Furey | H04B 10/807 | 398/38 |
| 2014/0287681 | A1 * | 9/2014 | Ollikainen | H02J 50/30 | 455/41.1 |
| 2015/0214414 | A1 * | 7/2015 | Hodges | H02S 99/00 | 136/246 |
| 2015/0335231 | A1 * | 11/2015 | Van Der Mark | A61B 5/036 | 600/407 |
| 2016/0049831 | A1 * | 2/2016 | Nakano | G01R 29/0878 | 307/104 |
| 2016/0197578 | A1 * | 7/2016 | Dupraz | H02S 40/32 | 250/205 |
| 2017/0019180 | A1 * | 1/2017 | Lucrecio | H04B 10/1143 | |
| 2018/0241216 | A1 * | 8/2018 | Ishigaki | H02J 50/30 | |
| 2019/0019912 | A1 | 1/2019 | Nugent, Jr. et al. | | |
| 2019/0064353 | A1 * | 2/2019 | Nugent, Jr. | H02J 50/60 | |
| 2019/0229558 | A1 * | 7/2019 | Pigeon | H04B 10/807 | |
| 2021/0288722 | A1 * | 9/2021 | Chen | H01L 31/0312 | |

* cited by examiner

POWER-OVER-FIBER SYSTEM AND METHOD FOR OPERATING A POWER-OVER-FIBER SYSTEM

TECHNICAL FIELD OF THE INVENTION

The invention relates to the technical field of energy supply systems. In particular, the invention relates to a power-over-fiber (PoF) system, a method for operating a PoF system, a measurement device comprising such a PoF system as well as the use of such a PoF system in a measurement device.

BACKGROUND OF THE INVENTION

A Power-over-fiber (PoF) system uses optical power transmitted in an optic fiber cable as an energy source. Such a systems allows remotely powering a device, while electrically isolating the device from a power supply. For instance, a PoF system can be used to power components of a measurement device, which are electrically isolated from the rest of the device to avoid electrical interferences or disturbances.

Generally, a PoF system relies on a conversion of the optical power into electrical power via a conversion element of the system. The electrical power can then be supplied to the powered device. However, over time, the electrical output power of the system can be reduced, e.g. due to a deterioration of the conversion element over time or due to temperature effects, so that at some point not enough energy is supplied to the device.

The document US 2019/0019912 A1 discloses a power-over-fiber safety system, comprising a high-flux electromagnetic energy transmitter and a fiber-based conduit optically coupling the energy transmitter to an electromagnetic energy receiver arranged to convert received light into electricity. The system further comprises a light-detecting sensor, which receives at least some light from the receiver via a further fiber-based conduit, wherein an output of the light from the transmitter is controlled based on a control signal from the sensor. However, this sensor does not provide any information about the output power of the electromagnetic energy receiver. Instead, it only monitors if light arrives at the receiver.

The document GB 2 177 869 A discloses a power transmission equipment, which allows to energize a load, such as a measuring and/or controlling device in an industrial control system, at a remote location by power transmitted from a light source. Thereby, the amount of power transmitted to suit the requirements of the load can be adjusting by changing a modulation of the light power. However, this equipment cannot detect a deterioration of the light conversion to electrical energy.

If not enough electrical energy is supplied by such a PoF system, the operation of the device powered by the PoF system may be interrupted or disturbed. To prevent such a failure of the device, it can be equipped with an additional energy storage, e.g. a battery, which steps in if the PoF system does not supply enough energy. However, this leads to additional costs and complexity.

Thus, it is an objective to provide an improved PoF system, an improved method for operating a PoF system, and an improved measurement device comprising a PoF system, which avoid the above-mentioned disadvantages.

SUMMARY OF THE INVENTION

The object of the present invention is achieved by the solution provided in the enclosed independent claims. Advantageous implementations of the present invention are further defined in the dependent claims.

According to a first aspect, the invention relates to a power-over-fiber (PoF) system, comprising: an optical source configured to generate an optical signal, wherein the optical signal comprises an intensity modulation; an optical fiber configured to receive the optical signal from the optical source and to guide the optical signal; an optical sink, which is configured to receive the optical signal from the optical fiber and to convert the optical signal into an electrical signal; a detection unit, which is configured to detect at least one characteristic of the electrical signal, wherein the characteristic is at least partially caused by the intensity modulation of the optical signal; and a control unit, which is configured to control the optical source based on the detected characteristic. This achieves the advantage that a PoF system is provided, which provides a particularly stable energy supply. In particular, the PoF system can detect and instantaneously compensate an unwanted reduction of an electrical output power of the system, which is, for instance, caused by a deterioration of the optical sink over time or by temperature effects.

Thereby, the detected characteristic of the electrical signal can be a measure of a conversion efficiency of the optical sink. To compensate a reduced conversion efficiency and the resulting reduced energy output of the sink, the optical source can be controlled to increase its output power.

The optical fiber can be an optical-fiber cable, which comprises one or more optical fiber elements to carry the optical signal. The optical fiber elements can be made from silica or plastic. In particular, the optical fiber is configured to guide the optical signal by total internal reflection.

The optical fiber can be configured to transmit further optical signals, in particular communication signals. For instance, the optical fiber can be configured to transmit a detection signal from the detection unit to the control unit, or a control signal from the control unit to the optical source, depending on the arrangement of these components. Alternatively, the system can comprise an additional optical fiber configured to transmit such communication signals.

The optical signal can be a light generated by the optical source. In particular, the optical source is configured to generated the optical signal in form of a light beam, and the optical fiber is arranged in such a way, that the light beam is at least partially coupled into the optical fiber. The system may further comprise means, such as optics, to facilitate this coupling.

Preferably, the optical source and the optical sink are separated by a galvanic isolation. In this way, the receiver of the electrical power provided by the PoF system can be electrically isolated from a power source of the system. The detection unit and/or the control unit can be arranged on either side of the galvanic isolation.

The control unit can comprise a processor, in particular a microprocessor. The control unit can comprise means to receive the detected characteristic or a parameter derived from the detected characteristic from the detection unit.

The detection unit can be a detector or a sensor. The detection unit can comprise means to filter-out and/or decouple the characteristic from the electrical signal. The detection unit can further comprise means to analyze the characteristic.

The control unit and the detection unit can either be separate components of the PoF system, or they can both be comprised in a common component, such as a controller, of the PoF system. The control unit and/or the detection unit can be components of the optical sink.

In an embodiment, the detected characteristic is a modulation, in particular a modulation amplitude, of the electrical signal.

Preferably, the intensity modulation of the optical signal causes the modulation of the electrical signal generated at the optical sink. The optical sink can comprise an optical-to-electrical power converter, in particular a photovoltaic cell. Under ideal conditions this photovoltaic cell, has a low internal resistance, leading to a relatively small modulation of the electrical signal. However, if a light output of the optical sink deteriorates, e.g. due to age or temperature effects, the electrical resistance of the sink increases, which leads to an increase of the modulation amplitude of the electrical signal. This increased amplitude can be detected by the detection unit.

For example, the control unit is configured to control the optical source to increase its light output, if the detected modulation amplitude of the electrical signal exceeds a threshold value.

In an embodiment, the optical sink comprises a photovoltaic cell, which is configured to convert the optical signal into the electrical signal. This achieves the advantage that the electrical signal can efficiently be generated.

The characteristic of the electrical signal can be correlated to a photovoltaic cell load characteristic, e.g. an internal resistance of the photovoltaic cell.

Preferably, the optical sink comprises means to facilitate guiding the light that is coupled out of the optical fiber onto the photovoltaic cell, e.g. a support to fixate the optical fiber above the photovoltaic cell and/or optics, such as lenses, to illuminate the cell evenly.

In an embodiment, the control unit is configured to determine a property of the optical sink, in particular an efficiency of an energy conversion and/or an internal resistance, based on the detected characteristic, and to control the optical source based on said property of the optical sink. This achieves the advantage that a reduced performance of the optical sink can efficiently be detected and compensated.

In an embodiment, the control unit is configured to evaluate the intensity modulation of the optical signal based on the detected characteristic and to control the optical source based on the evaluation. This achieves the advantage that the performance of the optical source can be optimized. In this way, the lifespan, the heat dissipation and/or the power consumption of the optical source can be improved.

In an embodiment, the control unit is configured to evaluate a modulation of a current for driving the optical source based on the detected characteristic and to control the optical source based on the evaluation. This achieves the advantage that the performance of the optical source can be optimized. In this way, the lifespan, the heat dissipation and/or the power consumption of the optical source can be improved.

In an embodiment, the control unit is configured to control the optical source to change, in particular enhance, an optical power of the optical signal based on the detected characteristic. This achieves the advantage that a reduced performance of the optical sink can efficiently be compensated.

In an embodiment, the optical sink is galvanically isolated from the optical source. This achieves the advantage that the measurement device that is powered by the PoF system can be electrically isolated from a power source of the system.

In an embodiment, the optical source comprises a laser, in particular a laser diode. This achieves the advantage that the optical signal can efficiently be generated.

In an embodiment, the optical source comprises a signal generator, which is configured to generate the intensity modulation of the optical signal. This achieves the advantage that the modulation of the optical signal can efficiently be generated and adjusted.

In particular, the signal generator is configured to generate a modulation signal that is superimposed on a supply signal of the optical source, which in turn causes the modulation of the intensity of the optical signal generated by the optical source.

In an embodiment, the optical source comprises a DC/DC converter, wherein the intensity modulation of the optical signal is caused by a ripple current of the DC/DC converter. This achieves the advantage that no extra components to generate the modulation of the optical signal are required.

According to a second aspect, the invention refers to a measurement device having a galvanically isolated measurement probe, wherein the measurement device comprises the PoF system according to the first aspect of the invention to power the measurement probe. This achieves the advantage that a measurement device with a PoF energy supply is provided, which provides a particularly stable energy supply.

The PoF system can be a DC power supply of the measurement device. The measurement device can be configured to measure electrical signals, in particular radio frequency signals. For example, the measurement device is configured to measure small signals at high reference potentials via its electrically isolated measurement probe. The measurement device is, for instance, an oscilloscope or a signal analyzer.

According to a third aspect, the invention refers to a use of the PoF system according to the first aspect of the invention to power a galvanically isolated measurement probe.

According to a fourth aspect, the invention refers to a method of operating a power-over-fiber (PoF) system, comprising:
  generating an optical signal with an optical source, wherein the optical signal comprises an intensity modulation;
  receiving the optical signal from the optical source with an optical fiber and guiding the optical signal with the optical fiber;
  converting the optical signal into an electrical signal;
  detecting at least one characteristic of the electrical signal, wherein the characteristic is at least partially caused by the intensity modulation of the optical signal; and
  controlling the optical source based on the detected characteristic.

This achieves the advantage that a particularly stable energy supply can be provided with the PoF system. In particular, the PoF system can detect and instantaneously compensate an unwanted reduction of an electrical output power of the system, which is, for instance, caused by a deterioration of the optical sink over time or by temperature effects.

In an embodiment, the optical signal is converted into an electrical signal by an optical sink, wherein the method comprises:
  determining a property of the optical sink, in particular an efficiency of an energy conversion and/or an internal resistance, based on the detected characteristic, wherein the optical source is controlled based on said property of the optical sink.

This achieves the advantage that a reduced performance of the optical sink can efficiently be detected and compensated.

Preferably, the optical sink comprises a photovoltaic cell, which is configured to convert the optical signal into the electrical signal.

In an embodiment, the step of controlling the optical source based on the detected characteristic, comprises:
controlling the optical source to change, in particular enhance, an optical power of the optical signal.

This achieves the advantage that a reduced performance of the optical sink can efficiently be compensated.

The above description with regard to the PoF system according to the first aspect of the invention is correspondingly valid for the method for operating the PoF system according to the fourth aspect of the invention.

BRIEF DESCRIPTION OF THE DRAWINGS

The invention will be explained in the followings together with the figures.

DETAILED DESCRIPTION OF THE PREFERRED EMBODIMENTS

Figure 1:
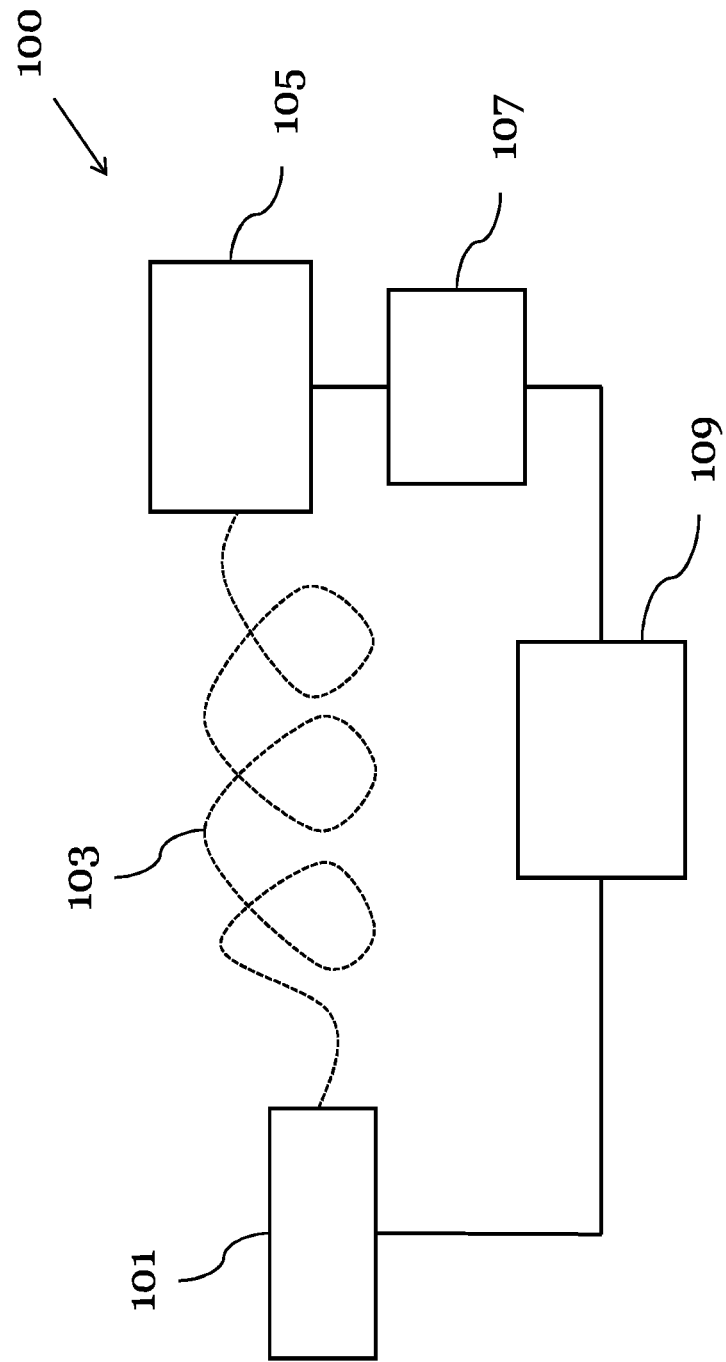
FIG. 1 shows a schematic diagram of a PoF system according to an embodiment.

FIG. 1 shows a schematic diagram of a power-over-fiber (PoF) system 100 according to an embodiment.

The POF system 100 comprises an optical source 101 configured to generate an optical signal, wherein the optical signal comprises an intensity modulation, an optical fiber 103 configured to receive the optical signal from the optical source 101 and to guide the optical signal, and an optical sink 105, which is configured to receive the optical signal from the optical fiber 103 and to convert the optical signal into an electrical signal.

The POF system 100 in FIG. 1 further comprises a detection unit 107, which is configured to detect at least one characteristic of the electrical signal, wherein the characteristic is at least partially caused by the intensity modulation of the optical signal, and a control unit 109, which is configured to control the optical source 101 based on the detected characteristic.

The optical source 101 can be a laser or can comprise a laser, which generates the optical signal in the form of a light beam. The optical fiber 103 is, for instance, an optical fiber cable, wherein one end of the cable is arranged in such a way, that the light beam generated by the laser is at least partially coupled into the cable.

The optical signal can then be guided through the fiber cable 103 to the optical sink 105, where it is coupled out of the other end of the fiber cable 103. The optical sink 105 can comprise a optical-to-electrical power converter, e.g. a photovoltaic cell, which is irradiated by the optical signal that is coupled out of the fiber cable 103 in order to generate electrical energy. The optical source 101 and the optical sink 105 can be located on different sides of a galvanic isolation stage.

The control unit 109 can comprise a processor, in particular a microprocessor. The detection unit 107 can be a detector or a sensor.

The control unit 109 and the detection unit 107 can be separate components of the PoF system 100, as shown in FIG. 1. Alternatively, the PoF system 100 can have a single controller unit that comprises both the control unit 109 and the detection unit 107. In particular, the control unit 109 and the detection unit 107 can be implemented in hardware and/or software.

The detected characteristic is, for example, an amplitude of a modulation of the electrical signal. In particular, the electrical signal comprises a voltage signal and the characteristic is a voltage amplitude of said voltage signal. This modulation can be a direct consequence of the intensity modulation of the optical signal. For example, the optical sink 105 comprises a photovoltaic cell, which, under preferred working conditions, has a low internal resistance. Due to this low internal resistance, the intensity modulation of the optical signal causes a relatively small modulation of the electrical signal. However, if the light output of the optical sink deteriorates, e.g. due to age or temperature effects, the electrical resistance of the optical sink 105 increases, which causes an increase of the modulation amplitude of the of the electrical signal. This increased amplitude can be detected by the detection unit 107.

Preferably, the control unit 109 is configured to control the optical source 101 to increase its light output, e.g. via increasing a power supply level, if the detected modulation amplitude of the electrical signal exceeds a threshold value. In this way, a reduced energy output of the optical sink 105 can be compensated almost instantaneously via a feedback control of the optical source.

In the same way, it is possible to detect a too high power output of the optical sink 105 if the modulation amplitude of the electrical signal is too low, e.g. if it falls below a second threshold. In this case, the control unit 109 can be configured to control the optical source 101 to decrease its light output, e.g. via decreasing a power supply level.

Generally, the control unit 109 can be configured to set the light output of the optical source 101 to an optical power level based on the magnitude of the detected modulation amplitude of the optical signal. For this purpose, the control unit 109 can be configured to use an algorithm or a look-up-table, which correlate a level of the detected modulation amplitude to a required output power of the optical source 101.

In a further embodiment, the control unit 109 is configured to determine and/or evaluate various parameters and components of the PoF system 100 based on the detected characteristic of the electrical signal. In particular, the control unit is configured to determine a property of the optical sink 105, e.g. an efficiency of an energy conversion, an intensity modulation of the optical signal, and/or a modulation of a current that is used to drive the optical source 101 based on the detected characteristic. In this way, the control unit 109 can monitor the operation of the PoF system 100 and identify failures.

The intensity modulation (or variation) of the optical signal can be caused by a modulation of a current and/or voltage that is used to drive the optical source 101. This modulation can be generated artificially via a signal generator, e.g. a function generator or an arbitrary waveform generator (AWG), or it can be a side effect of a component of an energy supply of the optical source 101. For example, the modulation is caused by a ripple current of a DC/DC converter, which is connected upstream of the optical source. If a signal generator is caused to generate the modulation, then the ripple current can be filtered out.

Figure 2:
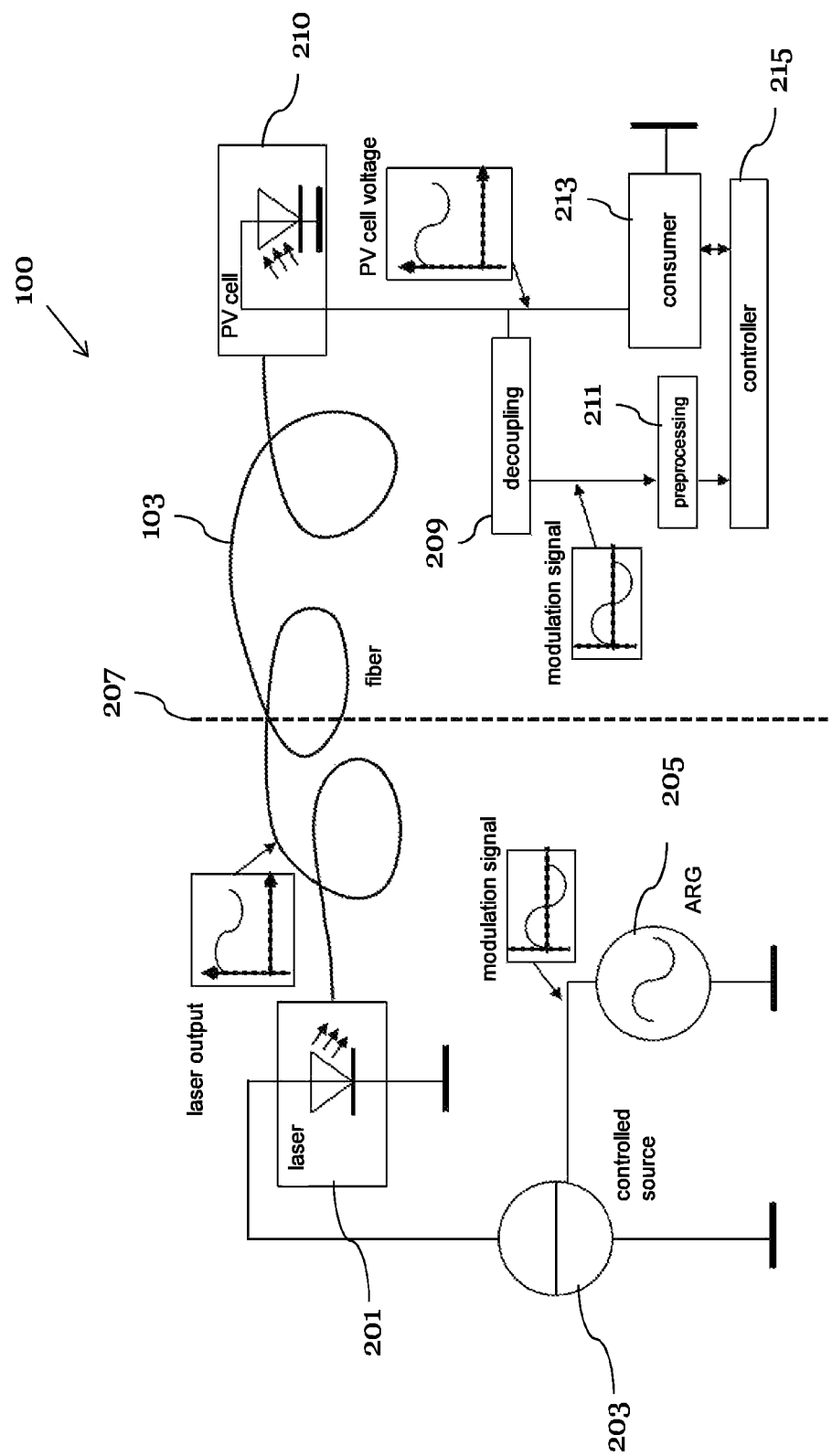
FIG. 2 shows a schematic diagram of a PoF system according to an embodiment.

FIG. 2 shows a schematic diagram of the PoF system 100 according to an embodiment.

The optical source of the PoF system 100 shown in FIG. 2 comprises a laser 201, e.g. a laser diode, for generating the optical signal, which is driven by a power source 203. The power source 203 is connected to an arbitrary signal generator (ARG) 205, which generates a modulation signal that is superimposed on a supply signal that is provided to the laser 201 by the power source 203. This modulation of the laser supply signal causes the intensity modulation of the optical signal generated by the laser 201.

As further shown in FIG. 2, the laser 201 couples the modulated optical signal into the optical fiber 103, which guides the optical signal to a photovoltaic (PV) cell 210 of the optical sink. The optical source, in particular the power source 203, and the photovoltaic cell 210 are thereby separated by a galvanic isolation 207.

The photovoltaic cell 210 converts the optical signal into a DC electrical signal, which can be supplied to a consumer 213, e.g. a measurement probe. Preferably, the electrical signal generated by the PV cell 210 comprises a modulation amplitude, which is caused by the intensity modulation of the laser output. This modulation can be decoupled from the electrical signal by a decoupling unit 209, and can be fed to a preprocessing unit 211 in the form of a modulation signal. The preprocessing unit 211 can be configured to preprocess and/or analyze the modulation signal. In particular, the decoupling unit 209 and the preprocessing unit 211 are components of the detection unit 107, as shown in FIG. 1.

The preprocessing unit 211 can be connected to a controller 215, which can correspond to the control unit 109 shown in FIG. 1. The preprocessing unit 211 can provide a detected level of the modulation amplitude of the electrical signal to the controller 215, and the controller 215 can control the optical source based on this level. For example, the controller 215 is configured to control the power source 203 to increase a supply signal if the modulation amplitude exceeds a threshold value. The controller 215 can forward a control signal, e.g. a digital signal, to the optical source via the optical fiber 103, via an additional optical fiber cable not shown in FIG. 2. Alternatively, the controller 215 can forward the control signal wirelessly.

The controller 215 may also be configured to control the signal generator, in particular the ARG 205, to change a modulation of the optical signal. Further, the controller 215 can be connected to the consumer 213, e.g. to retrieve a power demand of the consumer and to control the optical source based on said power demand.

Preferably, controlling the laser 201 output power via a feedback control based on the electrical signal can further improve a lifespan, a heat dissipation and/or a power consumption of the laser 201.

Figure 3:
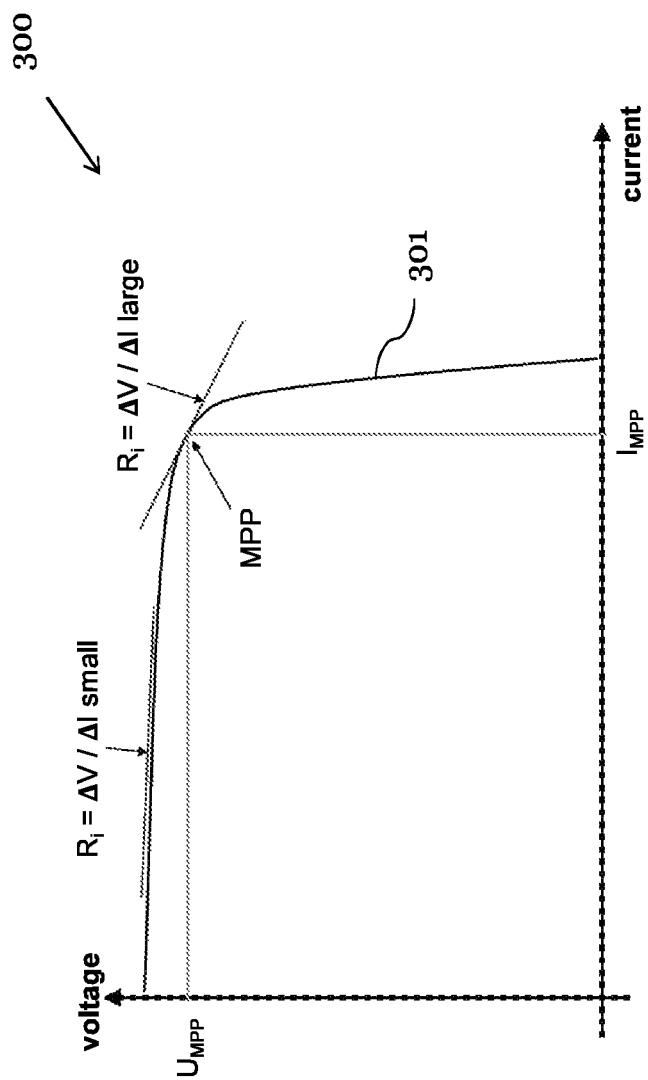
FIG. 3 show a plot of a current—voltage characteristic of a photovoltaic cell according to an embodiment.

FIG. 3 show a schematic plot 300 of a current—voltage characteristic of the photovoltaic cell 210 according to an embodiment.

The plot 300 shows an I-V-curve 301 of the illuminated PV cell 210, which indicates the current-voltage correlation of the PV cell 210. The electrical output power of the PV cell 210 is the product of current and voltage (P=V*I). The internal resistance ($R_i$) of the PV cell 210 corresponds to the first derivative of the I-V curve 301 at each point and, thus, depends on current and voltage.

Preferably, the power source 203 of the optical source 101 is modulated with a small modulation signal to generate the intensity modulation of the optical signal. At sufficient output power, the PV cell 210 has a very low internal electrical resistance. Thus, the voltage modulation at the PV cell 210 that is caused by the intensity modulation of the optical signal is small. If the output power of the PV cell 210 deteriorates, e.g. due to aging or temperature, the output power of the PV cell 210 approaches the maximum power point (MPP). At the MPP, the differential electrical resistance is much higher resulting in a larger amplitude of the modulated voltage signal. For instance, the maximal electrical output power at the maximum power point is: $P_{MAX}=U_{MPP}*I_{MPP}$ (depending on the optical power).

Figure 4:
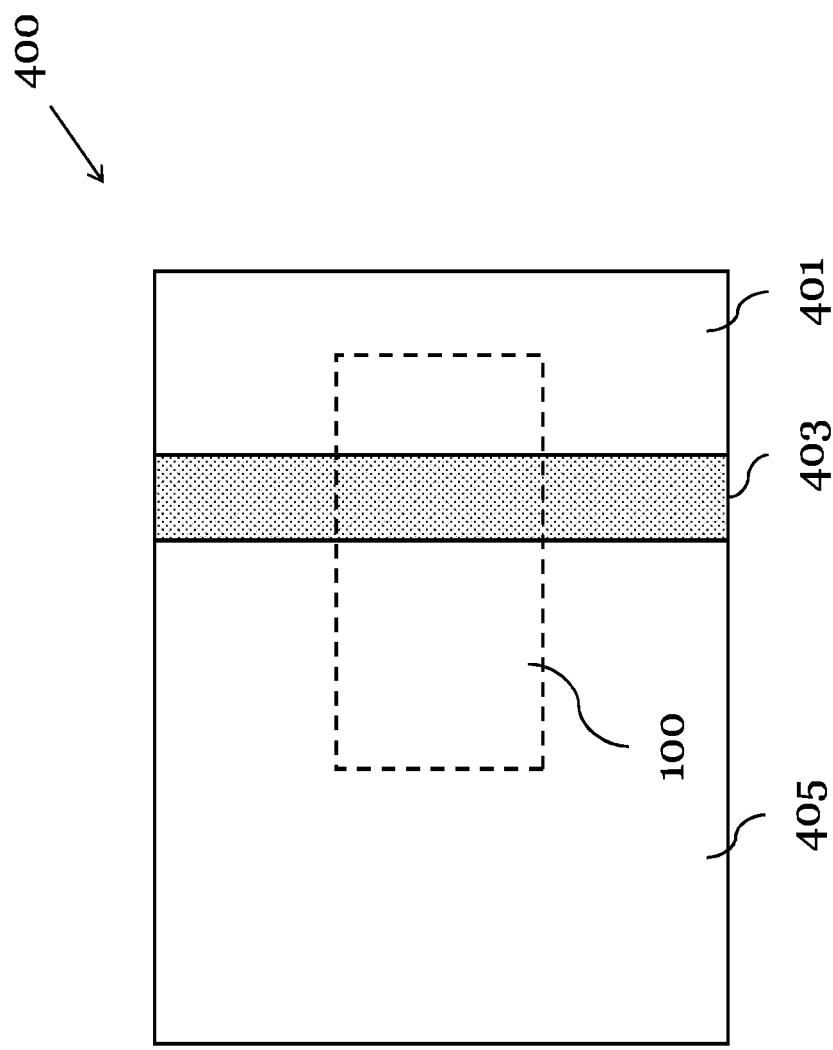
FIG. 4 shows a schematic diagram of a measurement device comprising a PoF system according to an embodiment.

FIG. 4 shows a schematic diagram of a measurement device 400 comprising a PoF system 100 according to an embodiment. For example, the measurement device is an oscilloscope or a signal analyzer.

The measurement device 400 can have a galvanic isolation 403 which isolates a measurement probe 401, in particular a probe head, from a base body 405 of the device. The PoF system 100 can be arranged to power the measurement probe 401.

The PoF system 100 can be a DC power supply of the probe 401. The measurement device 400 can be configured to measure electrical signals, in particular radio frequency signals. In particular, the measurement device 400 is configured to measure small signals at high reference potentials via its electrically isolated measurement probe 401.

Preferably, the optical sink 105 is arranged in the probe 401 and the optical source 101 is arranged in the base body 405 of the measurement device. Measurement data that are recorded by the probe 401 can be transmitted to the base body 405 via an additional optical fiber.

Figure 5:
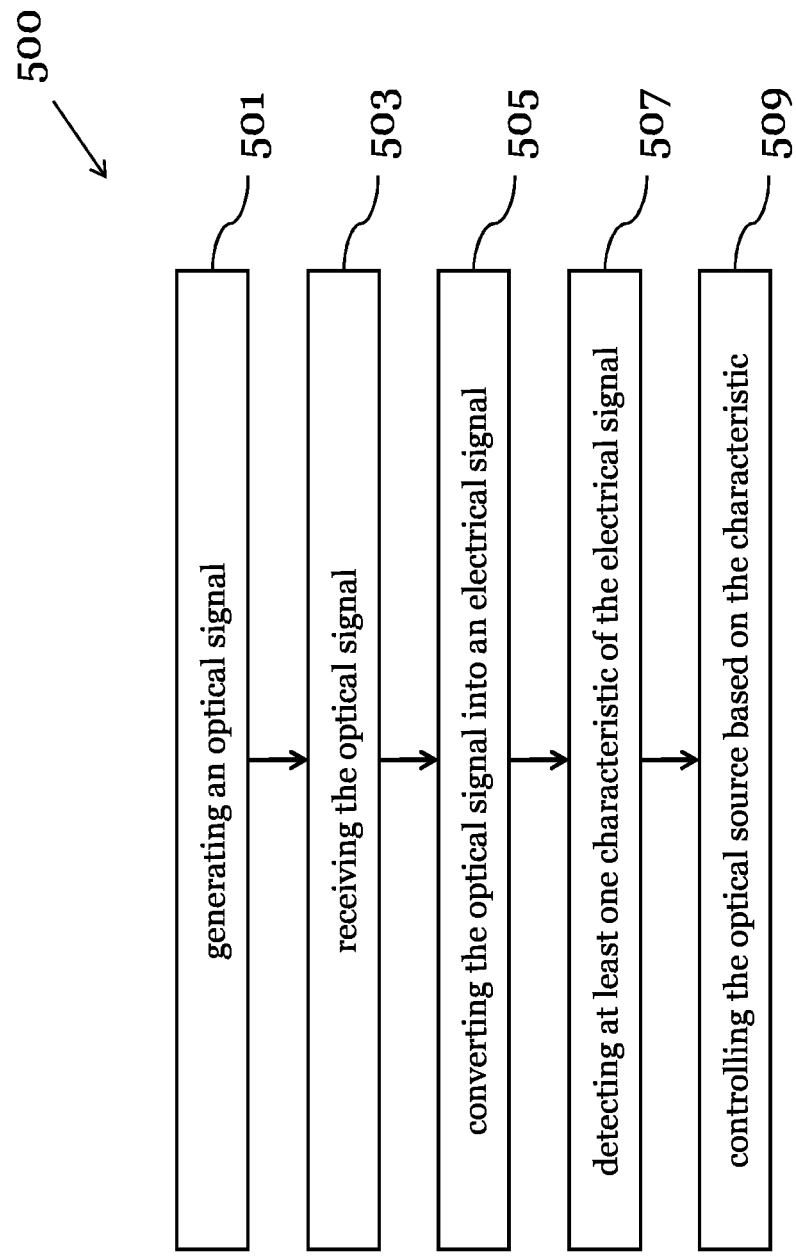
FIG. 5 shows a schematic diagram of a method for operating a PoF system according to an embodiment.

FIG. 5 shows a schematic diagram of a method 500 for operating the PoF system 100 according to an embodiment.

The method 500 comprises the following steps:
generating 501 the optical signal with the optical source 101, wherein the optical signal comprises an intensity modulation;
receiving 503 the optical signal from the optical source 101 with the optical fiber 103 and guiding the optical signal with the optical fiber 103;
converting 505 the optical signal into an electrical signal;
detecting 507 at least one characteristic of the electrical signal, wherein the characteristic is at least partially caused by the intensity modulation of the optical signal; and
controlling 509 the optical source 101 based on the detected characteristic.

Preferably, the optical signal is converted into an electrical signal by the optical sink 105, in particular by a photovoltaic cell 210, wherein the method 500 further comprises:
determining a property of the optical sink 105, in particular an efficiency of an energy conversion and/or an internal resistance of the photovoltaic cell 210, based on the detected characteristic, wherein the optical source 101 is controlled based on said property of the optical sink 105.

Preferably, the step of controlling the optical source 101 based on the detected characteristic, comprises:
controlling the optical source 101 to change, in particular enhance, an optical power of the optical signal.

All features of all embodiments described, shown and/or claimed herein can be combined with each other.

The invention claimed is:

1. A power-over-fiber (PoF) system, comprising:
a measurement device, wherein the PoF system powers a measurement probe of the measurement device, the PoF system being electrically isolated from the measurement probe, and the PoF system further comprising:
an optical source configured to generate an optical signal, wherein the optical signal comprises an intensity modulation;
an optical fiber configured to receive the optical signal from the optical source and to guide the optical signal;
an optical sink, which is configured to receive the optical signal from the optical fiber and to convert the optical signal into an electrical signal;
a detection unit, which is configured to detect at least one characteristic of the electrical signal, wherein the characteristic is at least partially caused by the intensity modulation of the optical signal; and
a control unit, which is configured to control the optical source based on the detected characteristic, wherein the detected characteristic is a modulation, wherein the PoF system powers the measurement probe with the electrical signal.

2. The PoF system of claim 1, wherein the optical sink comprises a photovoltaic cell, which is configured to convert the optical signal into the electrical signal.

3. The PoF system of claim 1, wherein the control unit is configured to determine a property of the optical sink, in particular an efficiency of an energy conversion and/or an internal resistance, based on the detected characteristic, and to control the optical source based on said property of the optical sink.

4. The PoF system of claim 1, wherein the control unit is configured to evaluate the intensity modulation of the optical signal based on the detected characteristic and to control the optical source based on the evaluation.

5. The PoF system of claim 1, wherein the control unit is configured to evaluate a modulation of a current for driving the optical source based on the detected characteristic and to control the optical source based on the evaluation.

6. The PoF system of claim 1, wherein the control unit is configured to control the optical source to change, in particular enhance, an optical power of the optical signal based on the detected characteristic.

7. The PoF system of claim 1, wherein the optical sink is galvanically isolated from the optical source.

8. The PoF system of claim 1, wherein the optical source comprises a laser, in particular a laser diode.

9. The PoF system of claim 1, wherein the optical source comprises a signal generator, which is configured to generate the intensity modulation of the optical signal.

10. The PoF system of claim 1, wherein the optical source comprises a DC/DC converter, wherein the intensity modulation of the optical signal is caused by a ripple current of the DC/DC converter.

11. The PoF system according to claim 1, wherein the measurement probe is galvanically isolated from the PoF system.

12. A method of operating a power-over-fiber (PoF) system, the PoF system comprises a measurement device, wherein the PoF system powers a measurement probe of the measurement device, the PoF system being electrically isolated from the measurement probe, the method comprising:
generating an optical signal with an optical source, wherein the optical signal comprises an intensity modulation;
receiving the optical signal from the optical source with an optical fiber and guiding the optical signal with the optical fiber;
converting the optical signal into an electrical signal;
detecting at least one characteristic of the electrical signal, wherein the characteristic is at least partially caused by the intensity modulation of the optical signal; and
controlling the optical source based on the detected characteristic, wherein the detected characteristic is a modulation,
wherein the PoF system powers the measurement probe with the electrical signal.

13. The method of claim 12, wherein the optical signal is converted into an electrical signal by an optical sink, wherein the method comprises:
determining a property of the optical sink, in particular an efficiency of an energy conversion and/or an internal resistance, based on the detected characteristic, wherein the optical source is controlled based on said property of the optical sink.

14. The method of claim 12, wherein the step of controlling the optical source based on the detected characteristic, comprises:
controlling the optical source to change, in particular enhance, an optical power of the optical signal.

* * * * *